United States Patent

Chambers

[11] Patent Number: 5,273,256
[45] Date of Patent: Dec. 28, 1993

[54] QUICK-TO-GROUND CAMPER JACK

[75] Inventor: James W. Chambers, Rockford, Ill.

[73] Assignee: Atwood Industries, Inc., Rockford, Ill.

[21] Appl. No.: 963,592

[22] Filed: Oct. 20, 1992

[51] Int. Cl.$^5$ .............................................. B60S 9/02
[52] U.S. Cl. ................................... 254/45; 254/425
[58] Field of Search ............... 254/419, 420, 424, 425, 254/103, 98

[56] References Cited

U.S. PATENT DOCUMENTS

| | | | |
|---|---|---|---|
| 2,446,517 | 8/1948 | Black | 254/419 |
| 3,201,087 | 8/1965 | Dalton | 254/419 |
| 3,870,278 | 3/1975 | Lee | 254/98 |
| 4,316,601 | 2/1982 | Osborne et al. | 254/424 |
| 4,597,561 | 7/1986 | Wenzel | 254/45 |
| 4,796,864 | 1/1989 | Wilson | 254/425 |

FOREIGN PATENT DOCUMENTS 905379 7/1972 Canada ............................ 254/45

*Primary Examiner*—Robert C. Watson
*Attorney, Agent, or Firm*—Leydig, Voit & Mayer

[57] ABSTRACT

A jack for lifting a camper from the bed of a pick-up truck includes a ram with a foot which is normally disposed in a retracted position spaced above the ground to provide clearance during travel of the truck. After the foot has been lowered into contact with the ground, a hand crank is turned and rotates a ball screw which coacts with a ball nut to cause the ram to lift the camper from the truck. By releasing a latch, the retracted foot may be lowered quickly into contact with the ground without turning the crank and simply by stepping on and pushing downwardly against the foot to effect turning of the ball screw.

5 Claims, 5 Drawing Sheets

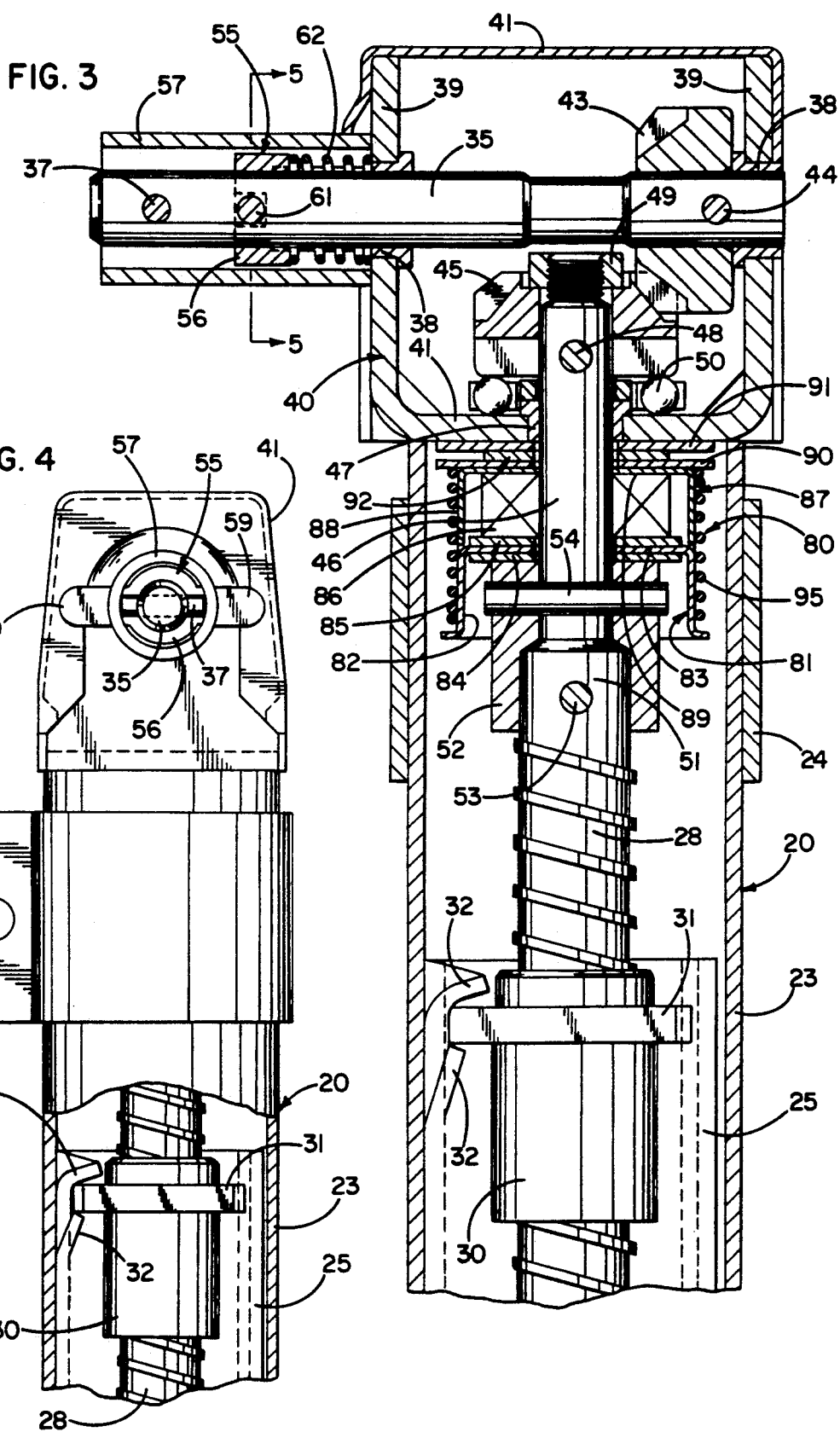

QUICK-TO-GROUND CAMPER JACK

BACKGROUND OF THE INVENTION

This invention relates to a jack for a camper and, more particularly, to a camper which is removably supported on the bed of a pick-up truck. A jack typically is located at each of the four corners of the camper and includes a ram which normally is retracted a substantial distance above the ground so as to clear the ground during travel of the truck. When it is desired to remove the camper from the truck, the rams of the jacks are advanced downwardly into engagement with the ground and, when further actuated, effect lifting of the camper from the bed of the truck so that the truck may be driven outwardly from beneath the camper.

In a manually operated jack of the foregoing type, actuation of the ram is effected by turning a hand crank which acts through right-angled gearing to rotate a lead screw. The latter is threaded into a nut which is non-rotatably attached to the ram. When the screw is rotated, the nut travels upwardly or downwardly along the screw in order to retract or advance the ram.

Because the rams of the jacks are retracted a substantial distance above the ground during normal travel of the truck, a significant amount of time is required to crank the rams downwardly into contact with the ground during removal of the camper and before the rams actually lift the camper from the truck. As a result, removal of the camper is relatively time-consuming.

SUMMARY OF THE INVENTION

The general aim of the present invention is to provide a new and improved camper jack having a ram which may be quickly and easily lowered from its retracted position and into contact with the ground without need of actuating the hand crank.

A more detailed object of the invention is to achieve the foregoing by providing a jack whose ram may be quickly lowered to the ground simply by stepping on and pushing downwardly against a foot on the lower end of the ram.

A further object is to provide a unique latch which normally holds the ram securely in its retracted position and which may be easily released to enable the ram to be lowered rapidly by pushing downwardly on the foot of the ram.

The invention also resides in the provision of a jack equipped with a relatively low friction ball screw and ball nut which reduce the effort required to actuate the jack while permitting fast lowering of the ram without need of actuating the hand crank.

These and other objects and advantages of the invention will become more apparent from the following detailed description when taken in conjunction with the accompanying drawings.

BRIEF DESCRIPTION OF THE DRAWINGS

FIG. 3 is an enlarged cross-sectional view of the upper portion of the jack shown in FIG. 2.

FIG. 4 is an elevational view, on a somewhat reduced scale, as seen from the left of the jack illustrated in FIG. 3, certain parts being broken away and shown in section.

DETAILED DESCRIPTION OF THE PREFERRED EMBODIMENT

Figures 1, 2:
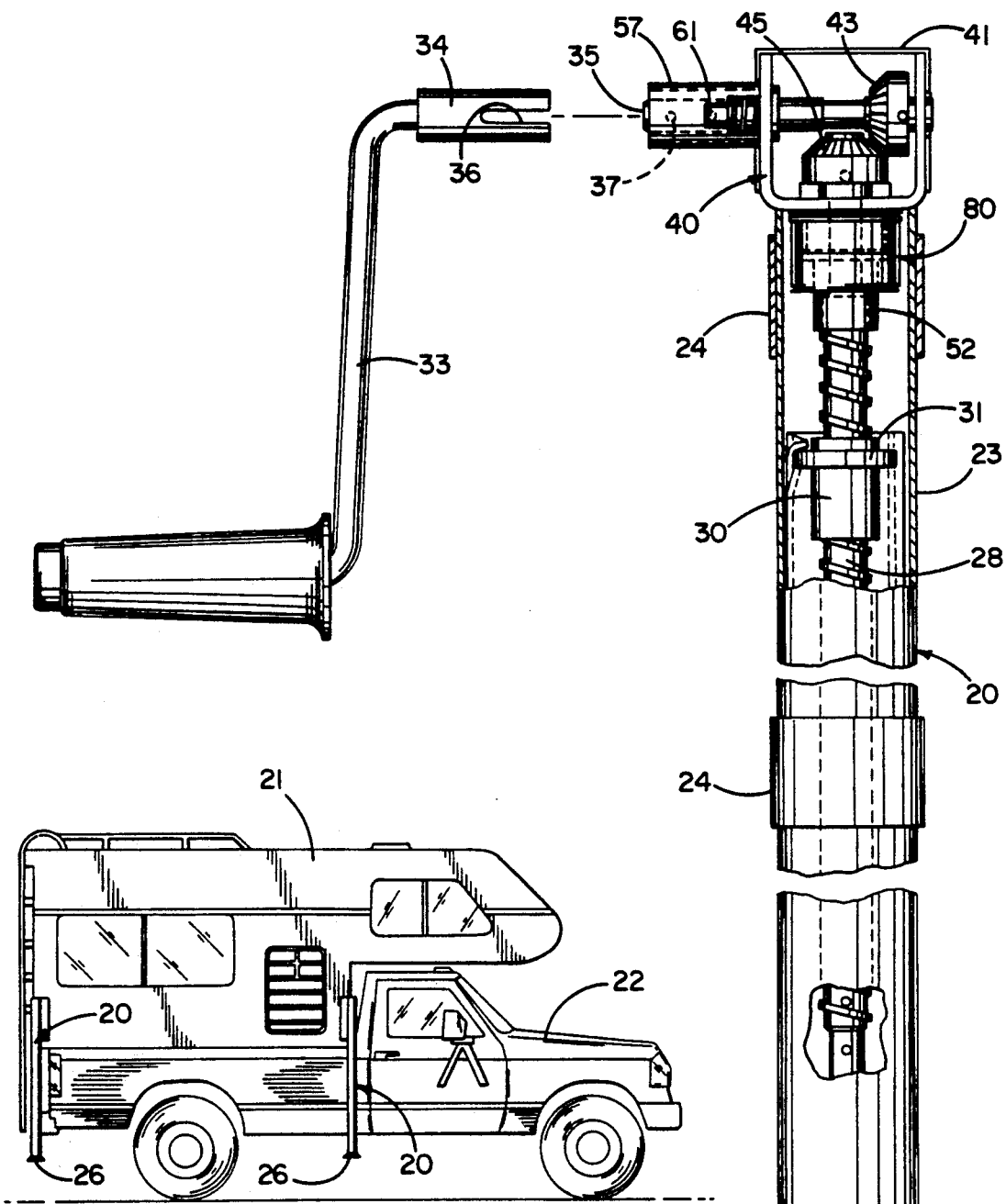
FIG. 1 is a side elevational view of a truck having a typical camper equipped with new and improved jacks incorporating the unique features of the present invention.
FIG. 2 is an enlarged side elevational view of one of the jacks, certain parts being broken away and shown in section. In addition, the hand crank is shown in exploded relation with the jack.

For purposes of illustration, the invention has been shown in the drawings as embodied in a jack 20 for lifting a camper 21 from the bed of a pick-up truck 22 and for supporting the camper when the latter is not in use. In this instance, one jack is located at each of the four corners of the camper so as to provide a four-point support when the camper is removed from the truck. The four jacks are substantially identical and thus a description of one will suffice for all.

As shown most clearly in FIG. 2, each jack 20 comprises an elongated and upright cylindrical outer tube 23 which is adapted to be fixed rigidly to the camper 21 by a pair of vertically spaced mounting brackets 24. Telescoped slidably into the tube and fixed against rotation relative thereto is an elongated hollow ram 25 whose lower end carries a ground-engaging foot 26. When the camper 21 is in place on the truck 22, the ram is retracted upwardly within the tube and is located such that the foot is spaced a substantial distance above the ground so as to provide clearance during travel of the truck. When the camper is to be removed from the truck, the ram is lowered within the tube until the foot engages the ground. Thereafter, the application of downward force on the ram causes the tube to move upwardly relative to the ram in order to lift the camper from the truck.

Advancement and retraction of the ram 25 are effected in response to rotation of an elongated lead screw which preferably is in the form of a ball screw 28 located within the ram and extending along a substantial length of the ram. The screw is supported for rotation relative to the ram but is prevented from moving axially within the ram. The screw is threaded into a ball nut 30 (FIGS. 3 and 4) located within the ram adjacent the upper end thereof and having a radial flange 31 which is clamped rigidly to the ram at three angularly spaced locations by fingers 32 lanced from the ram, the fingers preventing the nut both from rotating and from moving axially relative to the ram. In a well known manner, the ball nut contains a train of balls which, when the screw is rotated, circulate within the nut and around the screw so as to reduce friction between the two.

Figure 11:
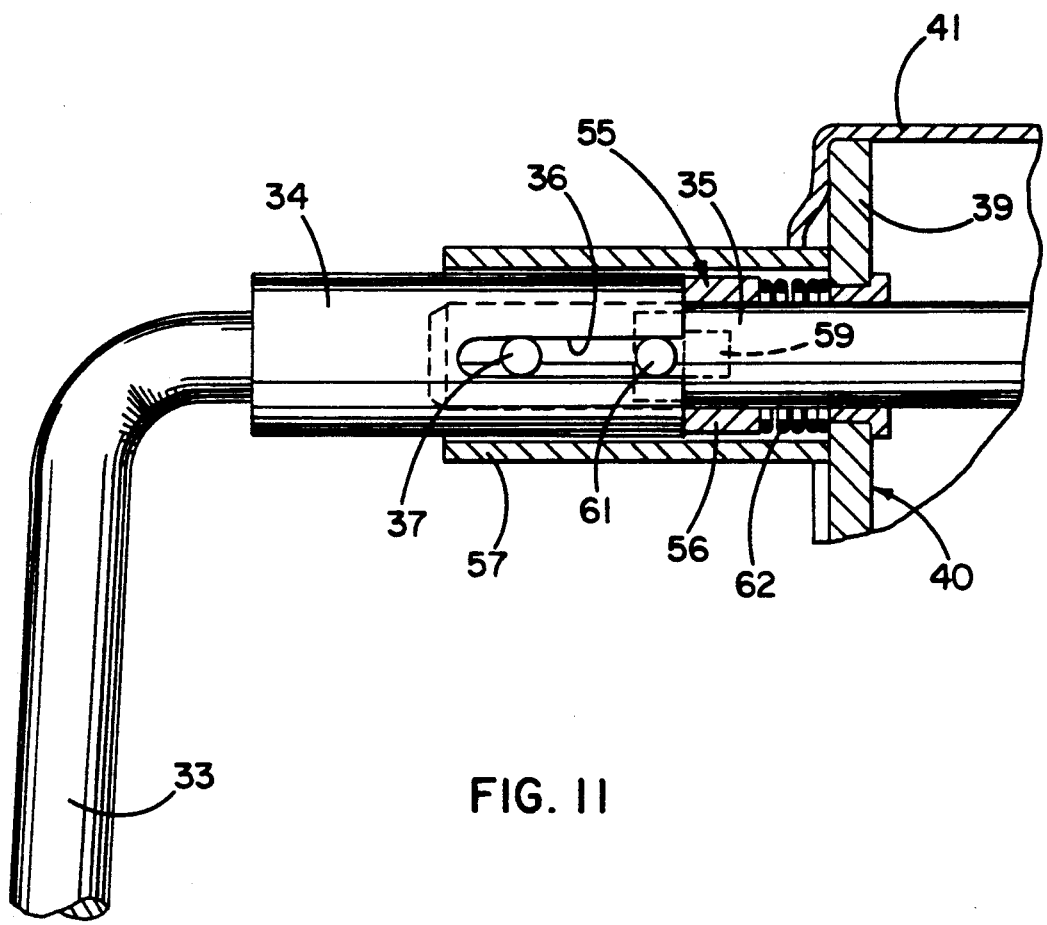
FIG. 11 is a fragmentary view similar to FIG. 6 but shows the hand crank in position to actuate the jack.

Rotation of the screw 28 is effected in response to manual turning of a hand crank 33 (FIG. 2) which is adapted to be removably coupled to the jack 20. As shown in FIGS. 2 and 11, the crank includes a tubular driving portion 34 adapted to telescope over a generally horizontal shaft 35 and having an end portion formed with slots 36 sized to couple drivingly with a pin 37 (FIG. 11) fixed rigidly to and extending radially through the shaft. The shaft is rotatably journaled by bushings 38 (FIG. 3) supported by the upright legs 39 of a generally U-shaped housing 40 having a bottom wall 41 fixed to the upper end of the tube 23, the housing normally being closed by a removable cover 41.

A right-angle gear set is contained within the housing 40 and includes a first bevel gear 43 (FIG. 3) which is coupled to the shaft 35 by a radial pin 44. The gear 43 meshes with a second bevel gear 45 located on the upper end portion of an upright shaft 46 which is journaled by a bushing 47 in the bottom wall 41 of the housing 40. A radial drive pin 48 couples the gear 45 to the shaft 46 while a nut 49 on the upper end of the shaft 46 holds the gear 45 against a thrust bearing 50 sandwiched between the gear and the bottom wall 41.

The lower end portion of the shaft 46 is connected to an unthreaded upper end portion 51 (FIG. 3) of the screw 28 by a coupling sleeve 52. Radial drive pins 53 and 54 secure the sleeve to the screw 28 and the shaft 46, respectively.

With the foregoing arrangement, the crank 33 may be coupled to the shaft 35 and turned to rotate the shaft. The latter acts through the gears 43 and 45, the shaft 46 and the coupling 52 to rotate the screw 28. When the crank is turned to rotate the screw in one direction, the screw coacts with the nut 30 to cause the ram 25 to move upwardly out of contact with the ground and to a retracted or stored position (see FIG. 1). Turning of the crank to rotate the screw in the opposite direction shifts the ram downwardly until the foot 26 engages the ground. Thereafter, continued turning of the crank and rotation of the screw cause the tube 23 to shift upwardly and lift the camper 21 from the truck 22.

The present invention eliminates the need for turning the crank 33 in order to lower the ram 25 sufficiently to bring the foot 26 into contact with the ground. Instead, the foot may be lowered quickly and easily from its retracted position to its ground-contacting position simply by stepping on and pushing downwardly against the foot. This saves the time otherwise required to crank the foot downwardly and also allows removal of the camper 21 with fewer turns of the crank.

More specifically, the foregoing is achieved by means of a latch 55 which is selectively operable to hold the shaft 35 and the screw 28 against rotation or to release the shaft and the screw for free rotation. When the latch releases the shaft and the screw for free rotation, pushing downwardly on the foot 26 applies an axial force to the ball nut 30 and, by virtue of the low friction between the nut and the screw, such force causes the screw to rotate so that the nut is driven downwardly along the screw to enable the foot to be lowered into contact with the ground.

Figure 8:
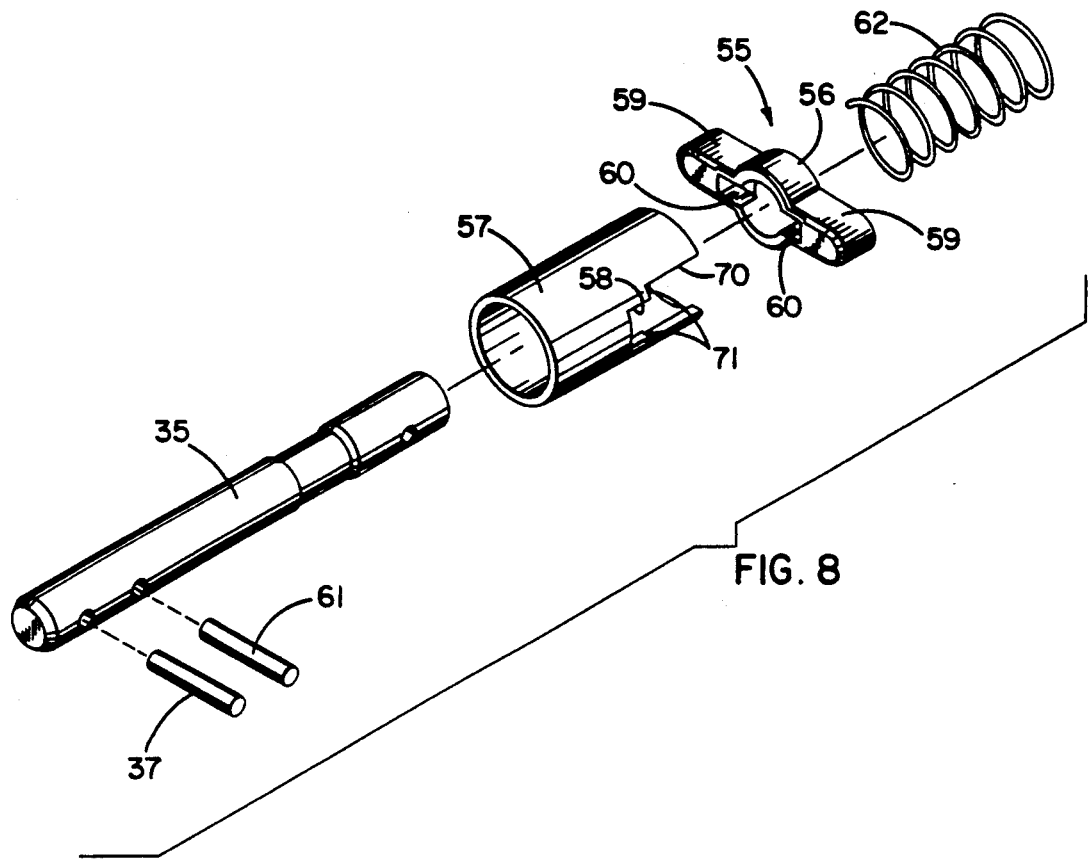
FIG. 8 is an exploded perspective view of the latch and associated components.

In the present instance, the latch 55 includes a collar 56 which is slidably mounted on the shaft 35 at a location between the drive pin 37 and the adjacent leg 39 of the housing 40. Surrounding the collar 56 is a sleeve 57 which is attached to and forms an extension of the housing 40. Diametrically spaced slots 58 (FIGS. 5 and 8) are formed through the sleeve and normally receive radially extending and diametrically spaced projections or ears 59 which are formed integrally with the collar 56.

Figure 7:
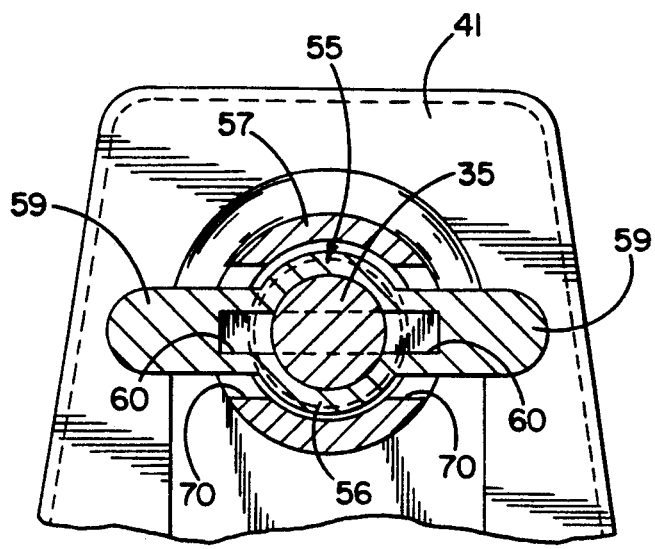
FIG. 7 is an enlarged fragmentary cross-section taken substantially along the line 7—7 of FIG. 6.

The outboard end of the collar 56 is formed with diametrically spaced slots or notches 60 (FIGS. 5, 7 and 8) which normally receive the end portions of a key which herein is in the form of a pin 61 extending radially through the shaft 35. A coil spring 62 (FIGS. 3 and 8) encircles the shaft 35, is compressed between the collar 56 and the adjacent leg 39 of the housing 40, and urges the collar to the left to cause the notches 60 to embrace the end portions of the pin 61.

Figure 5:
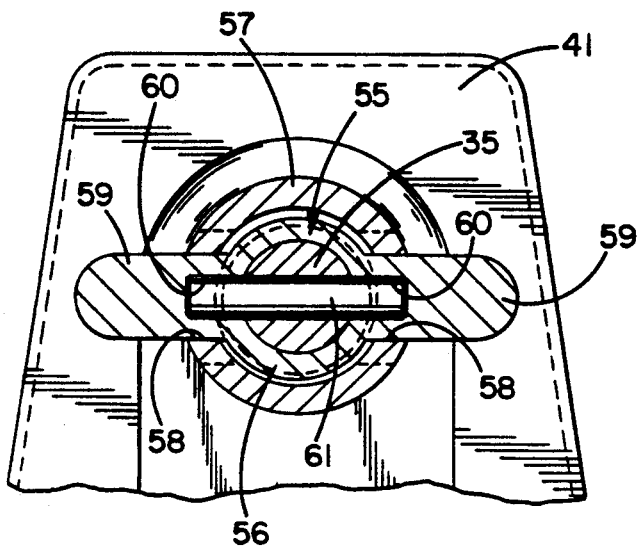
FIG. 5 is an enlarged fragmentary cross-section taken substantially along the line 5—5 of FIG. 3.
Figure 9:
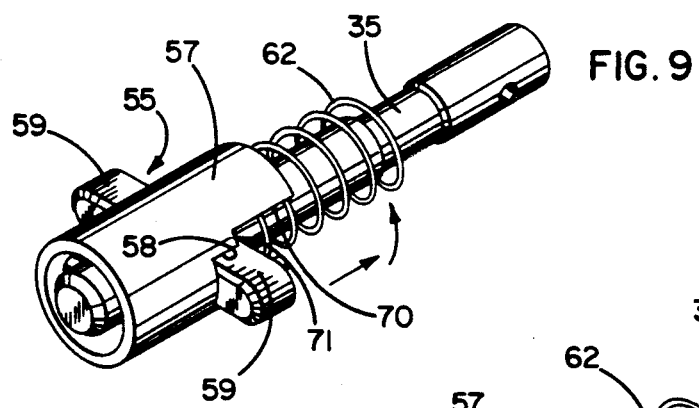
FIGS. 9 and 10 are perspective views showing the latch in its latched and unlatched positions, respectively.

When the ram 25 is in its retracted position, the collar 56 is in its latched position shown in FIGS. 3, 5 and 9. With the collar in its latched position, the shaft 35 and the screw 28 are prevented from rotating by virtue of the notches 60 and the pin 61 locking the shaft against rotation relative to the collar and by virtue of the ears 59 of the collar and the slots 58 of the fixed sleeve 57 locking the collar against rotation relative to the sleeve. Accordingly, the shaft and the screw are locked against rotation and thus hold the ram in its retracted position.

Figure 6:
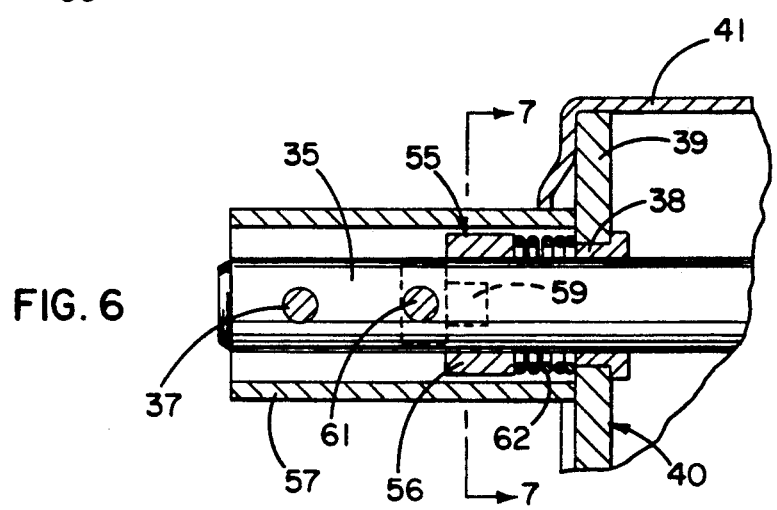
FIG. 6 is a fragmentary view similar to FIG. 3 but shows the latch of the jack in its unlatched position.
Figure 10:
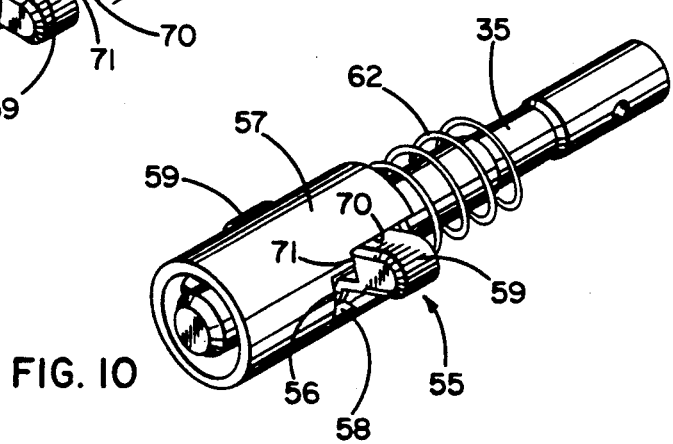

To release the ram 25 to move quickly toward the ground, the collar 56 is simply slid to the right along the shaft 35 to the position shown in FIGS. 6 and 10 by manually pushing on the projecting ears 59 of the collar. With the collar in the unlatched position of FIGS. 6 and 10, the notches 60 in the collar release the pin 61 as is apparent from FIGS. 6 and 7 and thus free the shaft 35 and the screw 28 for rotation. By then stepping on and pushing downwardly against the foot 26, the nut 30 causes the screw to turn and allow the foot to move rapidly downwardly until it contacts the ground. Thus, the foot may be moved quickly from its retracted position and into ground contact without need of turning the crank 33 through several revolutions to effect such movement.

Although it is possible to manually hold the collar 56 in its unlatched position while the foot 26 is being pushed downwardly, means preferably are provided for retaining the collar unlatched during the quick-to-ground operation. Herein, these means comprise a second pair of diametrically spaced slots 70 (FIGS. 7 and 8) formed in the sleeve 57 adjacent the slots 58 and having a width somewhat greater than that of the slots 58. As a result, axially facing shoulders or detent surfaces 71 are formed at the junction of each wide slot 70 with each narrower slot 58. As the collar 56 is pushed toward the right to its unlatched position, the ears 59 enter the wide slots 70. The collar then may be turned in either direction on the shaft 35 as shown in FIG. 10. When the collar is released, the spring 62 slides the collar reversely until the ears engage two of the shoulders 71. As a result of such engagement, the collar is releasably held in its unlatched position so that the foot 26 may be pushed downwardly without need of manually holding the collar unlatched.

After the foot 26 has been extended into contact with the ground, the driving portion 34 of the crank 33 may be telescoped over the shaft 35 to place the slots 36 in the driving portion in driving relation with the pin 37 (see FIG. 11). If the collar 56 is not in its unlatched position, the free end of the driving portion 34 pushes the collar to such position as the driving portion is slid onto the shaft, the slots 36 then engaging with the pin 61. The crank then may be turned to rotate the shaft 35 and the screw 28 and thereby lift the camper 21 from the truck 22.

Because of the relatively low friction between the ball screw 28 and the ball nut 30, the jack 20 is equipped with a brake 80 (FIG. 3) to prevent the screw 28 from unwinding and allowing retraction of the ram 25 when the ram is supporting the camper 21. Herein, the brake comprises a lower cup 81 having a side wall 82 and a top wall 83. The latter is sandwiched between two thrust washers 84 and 85. The thrust washer 84 engages the upper end of the sleeve 52 while the thrust washer 85 engages the lower race of a ball thrust bearing 86 on the shaft 46.

An upper cup 87 (FIG. 3) with a side wall 88 and a top wall 89 is positioned above the lower cup 81 and is located with its top wall in engagement with the upper race of the thrust bearing 86. A washer pack comprising a sandwich of two thrust washers 90 and 91 and an intermediate Oilite washer 92 is located between the top wall 89 of the cup 87 and the lower side of the bottom wall 41 of the housing 40, the washers 90 and 91 engaging the walls 89 and 41, respectively.

The brake 80 is completed by a helical spring 95 which is contracted around the side walls 82 and 88 of the cups 81 and 87. The spring 95 permits the cup 81 to rotate freely relative to the cup 87 in one direction but, when the cup 81 turns relative to the cup 87 in the other direction, the spring wraps down on the side walls of the cups and prevents relative rotation of the cups.

When the foot 26 is in contact with the ground and the crank 33 is turned to cause lifting of the camper 21, the lower cup 81 turns with the screw 28 by virtue of friction between the top of the sleeve 52, the thrust washer 84 and the top wall 83 of the cup 81. The lower race of the thrust bearing 86 also turns as a result of friction between the top wall 83 of the cup 81, the thrust washer 85, and the lower bearing race. In this direction of rotation, however, the spring 95 does not wrap down on the upper cup 87 and thus that cup does not turn.

When turning of the crank 33 is stopped, the screw 28 tends to rotate in the opposite direction due to the axial load applied to the nut 30 by the ram 25. When the lower cup 81 tends to rotate oppositely, however, it causes the spring 95 to wrap down on the upper cup 87 and impose torque on that cup. The washers 90, 91 and 92 create friction between the top wall 89 of the cup 87 and the bottom wall 41 of the housing 40 and thus retard rotation of the cup 87, the coupled cup 81 and the sleeve 52. The frictional retarding force is greater than the force tending to cause the screw 28 to unwind under load and thus the screw is prevented from turning and remains effective to hold the camper 21 in a jacked up position.

When the crank 33 is turned to retract the ram 25, the spring 95 causes both cups 81 and 87 to turn in unison. The torque applied to the shaft 46 via the gears 43 and 45 overcomes the friction created by the washers 90, 91 and 92 so that the screw 28 may turn and retract the ram 25.

From the foregoing, it will be apparent that the present invention brings to the art a new and improved camper jack 20 in which the foot 26 of the ram 25 may be quickly lowered to the ground without need of actuating the hand crank 33. As a result, significantly less time and effort are required to remove the camper 21 from the truck 22.

I claim:

1. A jack for a camper and comprising an elongated upright tube adapted to be fixed to the camper, a ram telescoped slidably into said tube and having a lower end, a ball nut connected to move with said ram and held against rotation relative to the ram, a ball screw threaded into said nut and operable when rotated to move said nut axially along said screw and thereby move said ram within said tube between a retracted position in which said lower end is spaced above the ground and an advanced position in which said lower end engages the ground, downward movement of said ram relative to said tube after said lower end engages the ground being effective to raise said tube and said camper, a housing on the upper end of said tube, right-angled gearing in said housing and operably connected to said screw, an input shaft connected to said gearing and operable when rotated manually to act through said gearing and effect rotation of said screw, latching means normally acting against said shaft and preventing rotation of said shaft and said screw so as to hold said ram in said retracted position, said latching means being manually releasable from said shaft to permit rotation of said shaft and said screw and thereby permit said ram to be moved rapidly from said retracted position to said advanced position by a downward force applied axially to the ram, said latching means comprising a collar telescoped slidably over said shaft, a spring normally urging said collar to slide to a latched position on said shaft, means coupling said shaft and said collar against rotation relative to said housing when said collar is in said latched position, said collar being manually movable along said shaft and against the bias of said spring to an unlatched position disabling said coupling means and enabling said shaft to rotate relative to said housing.

2. A jack as defined in claim 1 further including means for releasably holding said collar in said unlatched position.

3. A jack as defined in claim 1 in which said coupling means comprise a slot in said housing, a projection on said collar and extending through said slot, a key on said shaft, and a slot in said collar and receiving said key when said collar is in said latched position, said slot in said collar releasing said key when said collar is in said unlatched position.

4. A jack as defined in claim 3 in which said housing includes a detent surface, said slot in said housing including an enlarged portion which receives said projection when said collar is in said unlatched position, said collar, when in said unlatched position, being turnable to a position in which said projection engages said detent surface to releasably hold said collar in said unlatched position.

5. A jack for a camper and comprising an elongated upright tube adapted to be fixed to the camper, a ram telescoped slidably into said tube and having a lower end, a ball nut connected to move with said ram and held against rotation relative to the ram, a ball screw threaded into said nut and operable when rotated to move said nut axially along said screw and thereby move said ram within said tube between a retracted position in which said lower end is spaced above the ground and an advanced position in which said lower end engages the ground, downward movement of said ram relative to said tube after said lower end engages the ground being effective to raise said tube and said camper, a housing on the upper end of said tube, right-angled gearing in said housing and operably connected to said screw, an input shaft connected to said gearing and operable when rotated manually to act through said gearing and effect rotation of said screw, latching means normally acting against said shaft and preventing rotation of said shaft and said screw so as to hold said ram in said retraced position, said latching means being manually releasable from said shaft to permit rotation of said shaft and said screw and thereby permit said ram to be moved rapidly from said retracted position to said advanced position by a downward force applied axially to the ram, a brake restricting said screw from turning when an upward axial force is applied to said nut by said ram, said brake comprising upper and lower cups each having a top wall and a depending side wall, a frictional washer pack sandwiched between said housing and the top wall of said upper cup and restricting rotation of said upper cup, said lower cup being rotatable with said screw, and a wrap spring encircling the side walls of said cups and allowing said lower cup to turn relative to said upper cup when said screw is rotated in a direction to advance said ram downwardly, said spring contracting tightly around the side walls of said cups and preventing said lower cup from turning relative to said upper cup when said screw tends to rotate in a direction retracting said ram upwardly.

* * * * *